United States Patent [19]

Yoo et al.

[11] Patent Number: 4,986,998
[45] Date of Patent: Jan. 22, 1991

[54] PROCESS FOR MANUFACTURING DEHYDRATED FLAVORING FROM LIVESTOCK BLOOD

[75] Inventors: Ick-Jong Yoo, Ansan; Kyung-Hwan Kim; Young-Eon Kim, both of Seoul, all of Rep. of Korea

[73] Assignee: Korea Food Research Institute, Kyounki, Rep. of Korea

[21] Appl. No.: 470,700

[22] Filed: Jan. 26, 1990

[30] Foreign Application Priority Data

Nov. 22, 1989 [KR] Rep. of Korea ......................... 16987

[51] Int. Cl.$^5$ ............................................. A23L 1/221
[52] U.S. Cl. ..................... 426/647; 426/471; 426/488; 426/495; 426/650
[58] Field of Search ............... 426/647, 650, 471, 486, 426/487, 488, 495; 210/650, 651

[56] References Cited

U.S. PATENT DOCUMENTS 3,010,829 11/1961 Turner .
3,348,954 10/1967 Green .
3,706,571 12/1972 Dufault .......................... 426/495
4,490,361 12/1984 Heldebrant ...................... 424/101

FOREIGN PATENT DOCUMENTS 48-26236 7/1973 Japan ................................... 426/647

OTHER PUBLICATIONS

J. Fd Technol. 13,329–338, A. P. Imeson et al., 1978.
J. Food Sci 46:1782, P. A. Etheridge et al., 1981.
J. Food Sci 40:155, P. T. Tybor et al., 1975.
J. Sci. Food Agric 33:760, E. Slinde et al., 1982.

*Primary Examiner*—Arthur L. Corbin
*Attorney, Agent, or Firm*—Birch, Stewart, Kolasch & Birch

[57] ABSTRACT

Dehydrated flavorings are produced by using the blood of livestock including hydrolysis of the blood to convert protein to amino acid form, passing the hydrolyzed suspension through a granular type active charcoal column to remove poor color and odor properties from the hydrolyzed suspension, removing salt from the suspension by filtering, causing the suspension to taste meat-like by allowing it to react with sugars, and then powdering the suspension to produce a powdered blood product.

1 Claim, No Drawings

PROCESS FOR MANUFACTURING DEHYDRATED FLAVORING FROM LIVESTOCK BLOOD

BACKGROUND OF THE INVENTION

1. Field of the Invention

The present invention relates to a process for manufacturing dehydrated flavorings and more particularly, to a process for the preparation of dehydrated flavorings which have meat taste, which comprises hydrolysing livestock's blood, neutralizing, decolorizing and deodorizing it, and then desalting, heating, powdering, and seasoning it sequentially.

2. Description of the Related Art

Generally, livestock's blood contains about 17% by weight of protein. The blood can be separated into about 65% plasma and about 35% blood cells by centrifuging after preventing the blood from coagulating by adding an anticoagulant agent. The plasma contains 25% of the blood protein, the rest being in the blood cell portion.

The plasma protein has been processed for use by spray-drying or lyophilizing it after concentrating it. Such products have a number of problems such as, for example, it is difficult to remove salt therefrom and also the blood cells has a peculiar iron flavor from the hemoglobin, as well as a changeable color, and a bad smell. Globin protein products are used after partial removal from the hemoglobin. But such products require complicated separation equipment which is expensive to manufacture. Furthermore, these products do not utilize whole blood. Accordingly, there are products such as blood sausages and blood pudding which are processed foods made from using whole blood. There are also Korean foods such as Sundae (a kind of Korean blood sausage) and Sondgiguk (a kind of cooked blood soup). But most of the blood is thrown away as waste disposal.

Other conventional methods for processing blood and blood products are as follows:

(1) a method for producing blood powder food by drying with hot-air after coagulating whole blood (C. S. Hwang. 1977. livestock processing. Sun-Jin Munhwa Co., Seoul, Korea, 142);

(2) a method for concentrating separated plasma (Imeson, A. P. et al. 1978. J. Food Technol. 13:329, Etheridge, P. A. et al. 1981. J Food Sci. 46:1782);

(3) a method using blood cells after removing them from blood (Tybor, P. T. et al. 1975. J. Food Sci. 40:155);

(4) a processed food using whole blood which has a black color and peculiar flavor so as to limit its uses (Slinde, E. and M. Martens. 1882. J. Sci. Food Agric. 33:760, Slinde, E. et al. 1982. In "Proc. 28th Eur. Meat Res. Workers", Madrid, Spain, P 340);

(5) a process for inactivating a virus associated with biological material, e.g., protein fractions separated from blood plasma (U.S. Pat. No. 4,490,361);

(6) a method for preserving red corpuscle as a reactant for testing a red corpuscle condensating reaction, e.g., virus (Korea Pat. pub. No. 89-393);

(7) a method for producing sterilized blood powder by drying whole blood (Japan Pat. laid open pub. No. 283553/88);

(8) a method for concentrating livestock's blood (Japan Pat. laid open Pub. No. 294733/88);

(9) a method for the treatment of livestock's blood (Japan Pat. laid open Pub. No. 63-301773);

(10) a method for the preparation of a seasoned food which includes the steps of extracting beef or cow bones, mixing the extract with a pulverized and roasted salt, emulsifying the mixed suspension, atomizing and drying the product (Korea Pat. Pub. No. 86-1350);

(11) a method for producing solid brew having 40% protein density by concentrating a soup from boiling fish (Korea Pat. Pub. No. 86-1352),

(12) a method for producing main materials of shrimp flesh food, which comprises the steps of separating flesh from shells of shrimp after grinding the shrimp, frying the separated shells in oil, grinding the fried shells to about 150 mesh, and adding the grinded shells to a shrimp flesh (Korea Pat. Pub. No. 84-810);

(13) a method for the preparation of adding hydrolysed corpuscle to a pet food after hydrolysing corpuscle separated from blood by an enzyme (Japan Pat. laid open pub. No. 287449/88);

(14) a method for producing meat products which includes the steps of extracting water soluble constituents, treating the water insoluble residue with a mineral acid to form an acid soluble fraction, and combining the water soluble and acid soluble fractions (U.S. Pat. No. 3,010,829); and

(15) a method for producing roast beef flavorings by heating blood at 165° C. for 5-45 minutes after adding water, salt and lactic acid in amounts of 50%, 3%, and ? %, respectively, to meat (U.S. Pat. No. 3,348,954).

However, such conventional methods and food products do not include flavorings manufactured by hydrolysing blood. Thus such methods do not disclose or suggest the use of a simple process for using blood including about 17% of the protein so as to effectively utilize animal protein of good quality and reduce water contamination from waste materials.

SUMMARY OF THE INVENTION

Accordingly, it is an object of the present invention to provide dehydrated flavorings by removing unwanted materials from the blood of livestock. Thus the unwanted material can be removed by forming amino acid from hydrolysis of the blood and it can be removed by decolorization and deodorization.

Another object of the present invention is to provide a meat flavor by use of a heating reaction with sugars.

A further object of the present invention is to provide an improved method for the preparation of dehydrated flavorings which is inexpensive to manufacture and produces a high value product in a high yield using whole blood of the livestock.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a process for producing dehydrated flavorings by using the blood of livestock which comprises hydrolyzing the blood to convert protein to amino acid, passing the hydrolyzed blood over a granular type active charcoal column to remove problematic color and odor properties of the hydrolyzed suspension, removing salt from the suspension by filtering, allowing the suspension to react with sugars to provide a meat-like flavor and powdering the product.

DETAILED DESCRIPTION OF PREFERRED EMBODIMENTS

Referring now in detail to the present invention, there is provided hydrated flavorings from the blood of livestock.

The present invention is directed to a process for the preparation of hydrated flavorings in a high yield, which includes the following steps.

Step (a): Hydrolysis

Fresh blood can be collected from a slaughterhouse and anticoagulant in an amount of 1% by weight is added to the blood for the purpose of preventing coagulation. The anticoagulated blood should be kept below 4.C before hydrolysis. The blood may then be hydrolyzed with 4-10N hydrochloric acid solution of 30-70% (V/V) to the blood for 6-24 hours at 100-110 C. During hydrolysis, the protein of blood is hydrolysed by acid and converted to amino acid form, e.g. to cysteine, proline, glutamic acid, arginine and histidine, etc. Thereafter, the hydrolyzed suspension is cooled at room temperature and fat is removed from the hydrolyzed suspension. The hydrolyzed solution from blood can be obtained after filtering the resolved suspension.

Step (b): Neutralization

The suspension formed in step (a) is neutralized to about pH 4.8-6.2 with a 6-12N caustic soda solution and filtered. The weight of the neutralized solution is 150-200% as compared to the weight of the whole blood, generally.

Step (c): Decolorization and Deodorization

The neutralized suspension produced by step (b) is dark brown since it includes black materials, such as melanin, humin and humus. The neutralized suspension also emits a bad odor due to hydrolyzed acid smell generated from the sulfur-containing compounds, amine etc. In order to overcome the problems of color and odor, the neutralized suspension is passed through an active charcoal column. The active charcoal column contains granular type charcoal for easy passage and a high degree of refining efficiency. The contact time of the neutralized suspension with the active charcoal may be preferably about 15-25 minutes. The neutralized suspension after passage through the active charcoal column no longer exhibits a color or a bad odor. The charcoal treated changes in color to yellow and more than 95% of the protein of the whole blood from the hydrolysis process remains in amino acid form in the treated suspension.

Step (d): Desalting

The suspension formed in step (c) contains soda from the neutralization process and contains salt generated from the reaction with hydrochloric acid. The salt is removed from the suspension by ultrafiltration or vacuum concentration.

Step (e): Heating

Sugars in an amount of about 3-5% by weight are added to the suspension formed in step (d) and the suspension is then heated at about 95-170.C for about 1-4 hours. A Maillard reaction is generated between the added sugars and the amino acid of the suspension so as to provide a meat-like taste.

Step (f): Powdering

The heated suspension produced in step (e) is spray-dried using maltodextrin as a carrier which is added to the heated suspension and adjusted so that there is a 35-45% solid content. The adjusted suspension is powdered by spray drying at 110-130° C. at the inlet of the spray-dryer and 80°-90° C. at the outlet.

Step (g): Seasoning

Monosodium glutamate in an amount of 10-50% by weight, sodium succinate in an amount of 2-10% by weight, 5'-IMP (5'-inosine monophosphate) and 5'-GMP (5'-guanosine monophosphate) both in amounts of 1-3% by weight, and onion powder and garlic powder both in amounts of 2-5% by weight are added to the powder formed in step (e) sequentially. The monosodium glutamate and sodium succinate are added as flavor enhancers, and the 5'-IMP and 5'-GMP are added as flavor potentiators.

Other seasonings can be added or the amounts varied.

The present invention will now be described in more detail in connection with the following examples which should be considered as being exemplary and not limiting the present invention.

EXAMPLE 1

Step (a): 0.9 Kg of 10%-citrate solution and 5 Kg of 6N hydrochloric acid are added to 10 Kg of cow's blood in a reaction vessel. The added blood is heated for 10 hours at 110° C. and fat on the heated blood is removed. Thereafter, a hydrolyzed suspension of the blood can be obtained after filtering.

Step (b): 5.2 Kg of 6N caustic soda solution is contacted to the suspension formed in step (a) so as to neutralize it to pH 5.8 and the suspension is filtered.

The neutralized suspension has a weight of 17.93 Kg.

Step (c): The neutralized suspension is passed through granulated active charcoal for 15 minutes per unit volume and is decolorized and deodorized.

Step (d): Salt generated in a vacuum concentrator at 60±5° C. is filtered from the suspension.

Step (e): Water is added the suspension formed in step (e) to make the total weight 10 Kg. 352 g of sugars, i.e. glucose and saccharose in equal amounts, is added to the 10 Kg suspension with water. The suspension is boiled for 1-2 hours at 150-170° C. in an opened vessel. After boiling, a suspension having 47% solids and 17.4% salt density is obtained with a weight of 6.2 Kg.

Step (f): 1.7 Kg of maltodextrin and 3.7 Kg of water are added to the suspension formed in the step (e) after cooling the heated suspension to 40-50° C. The suspension is then adjusted to have 35-40% solid content to allow for spray drying.

The adjusted suspension is powdered by spray drying at 115° C. at the inlet and 85° C. of outlet. A powder is obtained weighing 3.58 Kg.

Step (g): 40% by weight of monosodium glutamate, 5% by weight of sodium succinate, 3% by weight of 5'-IMP and 5'-GMP, and 4% by weight of onion powder and garlic powder are mixed with the spray-dried powder formed in step (f).

EXAMPLE 2

Step (a): 0.9 Kg of 10%-citrate and 5 Kg of 6N hydrochloric acid are added to 10 Kg of pig's blood in a reaction vessel. The blood is heated for 16 hours at 110° C and fat in the heated blood is removed. A hydrolyzed suspension of the blood is obtained after filtering.

Step (b): 3.5 Kg of 10N caustic soda solution is contacted with the suspension formed in step (a) and it is neutralized to pH 6.2 and filtered.

The neutralized suspension weighs 17.56 Kg.

Step (c): The neutralized suspension is passed through granulated active charcoal for 20 minutes per unit volume and is decolorized and deodorized.

Steps (d), (e), (f), and (g) steps are repeated as in Example 1.

EXAMPLE 3

Step (a): 0.9 Kg of 10%-citrate solution and 6.5 Kg of 6N hydrochloric acid are added to 10 Kg of hen's blood in a reaction vessel. The added blood is heated for 24 hours at 110° C. and fat in the heated blood is removed. A hydrolyzed suspension of the blood is obtained after filtering.

Step (b): 4.5 Kg of 8N caustic soda solution is contacted with the suspension formed in step (a) and it is neutralized to pH 5.5 and filtered.

The neutralized suspension weighs 17.05 Kg.

Step (c): The neutralized suspension is passed through granulated active charcoal for 10 minutes per unit volume and is decolorized and deodorized.

Steps (d), (e), (f), and (g) are repeated as in Example 1.

EXAMPLE 4

A powdered product is produced using the same steps as in Example 1 but ultrafiltration is employed instead of step (d) in Example 1.

EXAMPLE 5

A powdered product is produced using the same steps as in Example 1 but when adding sugars, the ratio of saccharose to fructose is two to one, and the suspension is heated for 3-4 hours at 95°-120° C. instead of parameters of step (e) of Example 1.

EXAMPLE 6

A powdered product is produced using the same steps as in Example 1, except the adjusted suspension is powdered by spray drying at 120° C. at inlet and 90° C. at outlet instead of the parameters of step (f) of Example 1.

EXAMPLE 7

A powdered product is produced using the same steps as in Example 1 except 30% by weight of monosodium glutamate, 10% by weight of sodium succinate, 2% by weight of 5'-IMP and 5'-GMP, and 3% by weight of onion powder and garlic powder are mixed with the spray-dried powder instead of the parameters of step (g) of Example 1.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A process for manufacturing dehydrated flavorings from livestock blood, the process comprising the steps of:
   (a) hydrolyzing blood of livestock for 6-24 hours at a temperature of 100-110° C. after mixing 30-70% (V/V) of 4-10N hydrochloric acid solution with the blood to produce a hydrolyzed suspension;
   (b) neutralizing said suspension from step (a) at a pH 4.8-6.2 by contacting the suspension with 6-12N caustic soda solution to produce a neutralized suspension;
   (c) decolorizing and deodorizing said neutralized suspension of step (b) by contacting the suspension with granulated active charcoal for 15-25 minutes per unit volume to produce a decolorized and deodorized suspension;
   (d) removing salt from said decolorized and deodorized suspension from step (c) by ultrafiltration or vacuum concentration to produce a desalted suspension;
   (e) heating said desalted suspension from step (d) for 1-4 hours at a temperature of 95°-170° C., after adding 3-5% by weight of sugars, to produce a heated suspension;
   (f) spray drying said heated suspension of step (e) to form a power having a 35-45% solid content; and
   (g) seasoning said powder produced from step (f).

* * * * *